(12) United States Patent
Nielsen et al.

(10) Patent No.: US 8,127,664 B2
(45) Date of Patent: Mar. 6, 2012

(54) APPLIANCE FOR BREWING AN INFUSION OF COFFEE OR TEA

(75) Inventors: Henrik Nielsen, Fontainbleau (FR); Patrick Chateau, Gentilly (FR); David Petitdemange, Vaux le Pénil (FR); Aurélien Corbier, Lille (FR)

(73) Assignee: Handpresso, Samois sur Siene (FR)

( * ) Notice: Subject to any disclaimer, the term of this patent is extended or adjusted under 35 U.S.C. 154(b) by 730 days.

(21) Appl. No.: 12/162,960

(22) PCT Filed: Jan. 31, 2007

(86) PCT No.: PCT/FR2007/050714
§ 371 (c)(1),
(2), (4) Date: Jul. 31, 2008

(87) PCT Pub. No.: WO2007/088309
PCT Pub. Date: Aug. 9, 2007

(65) Prior Publication Data
US 2009/0029021 A1 Jan. 29, 2009

(30) Foreign Application Priority Data
Feb. 1, 2006 (FR) ...................................... 06 00910

(51) Int. Cl.
*A47J 31/00* (2006.01)

(52) U.S. Cl. ............................. 99/302 R; 99/323; 99/295
(58) Field of Classification Search .................... 99/323, 99/295, 302 R, 289 R, 323.3
See application file for complete search history.

(56) References Cited

U.S. PATENT DOCUMENTS
4,502,371 A * 3/1985 Di Lascio ....................... 99/293
(Continued)

FOREIGN PATENT DOCUMENTS
DE 3422432 A1 12/1985
(Continued)

*Primary Examiner* — Reginald L Alexander
(74) *Attorney, Agent, or Firm* — The Webb Law Firm (57) ABSTRACT

The invention relates to an appliance comprising a water tank, a housing including a chamber having an opening for receiving a fill of brew preparation, a chamber closure part having an outflow orifice and mounted to move between an open position and a closed position; means connected to the tank to act during a brewing cycle to deliver a certain volume of water raised to a brewing temperature, from said tank to said chamber. According to the invention, the appliance essentially consists in a portable structure comprising a head containing at least one chamber, a body including at least handle means making it possible, during the brewing cycle, to place the outflow orifice facing down towards a cup.

21 Claims, 4 Drawing Sheets

U.S. PATENT DOCUMENTS

| | | | | |
|---|---|---|---|---|
| 4,900,886 | A | * | 2/1990 | Bridges ................. 219/689 |
| 5,184,543 | A | * | 2/1993 | Victory ................... 99/533 |
| 5,622,099 | A | | 4/1997 | Frei et al. |
| 5,902,620 | A | * | 5/1999 | Nolan .................... 426/241 |
| 7,213,505 | B2 | | 5/2007 | Kollep |
| 7,461,585 | B2 | * | 12/2008 | Nenov et al. ............. 99/282 |
| 2002/0002913 | A1 | | 1/2002 | Mariller et al. |
| 2009/0101022 | A1 | * | 4/2009 | Levin ..................... 99/295 |

FOREIGN PATENT DOCUMENTS

| | | |
|---|---|---|
| DE | 19848370 A1 | 4/1999 |
| DE | 10125245 A1 | 4/2002 |
| EP | 1277428 A1 | 1/2003 |
| WO | 2005115206 A1 | 12/2005 |

* cited by examiner

APPLIANCE FOR BREWING AN INFUSION OF COFFEE OR TEA

BACKGROUND OF THE INVENTION

The invention relates to an appliance for brewing an infusion from a fill of brew preparation, such as coffee or tea in powder form or in a pack, the appliance comprising a water tank, a housing including a chamber presenting a nozzle for feeding hot water and an opening through which the fill of brew preparation can be inserted, means connected to the tank for acting during a brewing cycle to deliver a certain volume of water raised to a brewing temperature from said tank to said chamber, and a brew outflow orifice. The term "brew" should naturally be understood as being used herein in a broad sense, to designate any brewing of an infusion of tea, coffee, or of some other preparation of the same type.

More precisely, but not exclusively, the invention relates to an appliance further comprising a closure part for closing said chamber and mounted to move relative to said chamber, being capable of occupying an open position or a closed position corresponding respectively to filling/emptying said chamber, and to brewing the infusion.

Existing appliances of this type, e.g. as described in patent DE 3422432, possess a housing of large volume determined mainly by a large-capacity tank so as to enable a plurality of successive brewing cycles to be performed, and by rapid heater means presenting high thermal inertia, so as to enable a certain volume of water at the appropriate brewing temperature to be delivered, good for at least one to ten cups continuously.

In addition, those appliances having a moving closure part require a housing with a stand of large area in order to obtain good stability during those stages when it is being moved into the closed position or into the open position.

Furthermore, with such appliances, it is difficult for the user to envisage making an infusion away from home, e.g. while camping or in a vehicle, not only because of the size and the weight of the appliance, but also because it needs to be connected to an electricity means supply in order to power the pump means and in order to raise the water to an ideal temperature for brewing an infusion.

Nevertheless, in order to mitigate those drawbacks, vehicle appliances have been made, e.g. as described in European patent application EP-A 1 277 428. However, in spite of being of appropriate size, such appliances remain conventional in design, with practically the same bulky and expensive internal components.

In addition, when it is desired to brew and share an infusion of coffee in a meeting room, for example, known appliances are awkward to operate, and remain heavy, bulky, and noisy.

SUMMARY OF THE INVENTION

An object of the invention is thus to mitigate the drawbacks of the prior art by providing an appliance of greatly simplified design, of the portable type, and providing a high degree of convenience and safety in use.

This object is achieved by the fact that the appliance essentially consists in a portable structure comprising a head containing at least the chamber, and a body including at least handle means enabling the outflow orifice of the closure part to be placed, during the brewing cycle, to face down towards a cup for collecting the infusion.

The appliance may also include a control mechanism enabling the closure part to be placed in its open or closed position. The hot water feed nozzle may be situated in the end wall of the chamber. By way of example, the tank may form a portion of said head, or else of said body.

Advantageously, said means connected to the tank for acting during a brewing cycle to deliver a certain volume of water raised to a brewing temperature from said tank to said chamber may comprise pressurizing means for delivering the water to the chamber at a determined pressure.

Advantageously, said pressurizing means are pump means possibly comprising an electrically-driven air pump for establishing air pressure over the water in the tank, or else a water pump interposed between the tank and the chamber.

Advantageously, the water tank is also fitted with a safety valve for venting said tank to the atmosphere and capable of occupying either a free state in which it enables the tank to be vented to the atmosphere, or else a state in which it is closed under stress, in which it allows venting to the atmosphere only in the event of an abnormal excess pressure.

Advantageously, the closure part is releasably mounted on the housing and the closure part and the housing include mutual engagement means.

Advantageously, the appliance includes at least one optionally rechargeable battery for powering said pressurizing means, which battery may be arranged in said handle means.

Thus, by using the portable structure containing the essential technical elements needed for brewing an infusion, the user takes hold of the appliance in one hand and can thus act directly on the control mechanism, which does not require any special skill in order to work the appliance. In addition, because of this extremely cut-down, lightweight, and ergonomic construction, the appliance is highly independent and can be used anywhere. Furthermore, this roaming appliance can be connected to any source of electricity, mains or battery, in order to power the pump means and water heater means.

According to another important characteristic of the invention, and in order to ensure that the appliance is self-contained, the water tank is thermally insulated so as to be capable of receiving hot water and keeping it hot, which water is supplied thereto from the outside at a temperature that is suitable for brewing the infusion.

Thus, because there are no internal heater means specific to the water tank, it can be understood that the appliance does not need to be electrically connected to a powerful electricity supply, and can make do with a much smaller electricity supply, solely for the purpose of driving the pump means; and indeed it could be provided with pump means that are not electrically driven. This construction thus provides non-negligible independence, thereby making this appliance easy to use.

The invention also provides a method of brewing an infusion using an appliance of the type described above, the method comprising the following steps:
  opening the chamber by acting on the closure part and bringing the chamber into a position such that its opening faces upwards, or indeed, starting with the closure part in the open position, taking hold of the handle means in one hand so as to bring the chamber into a position such that its opening faces upwards;
  filling the tank with already-heated water, usually in the range 80° C. to 100° C.;
  placing a fill of brew preparation in powder form or in a pack into the infusion chamber;
  closing the chamber in sealed manner using the closure part;
  placing the outflow orifice facing downwards over a cup by turning the appliance over by means of its handle means;
  actuating said means connected to the tank to cause a certain volume of water raised to a brewing temperature to be delivered from said tank to said chamber, thereby causing the infusion to be brewed and to flow out through the outflow orifice from the closure part down towards said cup; and as soon as the cup is full, switching off said means connected to the tank in order to deliver a certain volume of water; and opening the chamber by acting on the closure part in order to remove the used fill.

More precisely, in order to close the chamber in sealed manner with the closure part, a control mechanism is actuated that comprises a drive member working a linkage for bringing said closure part against the opening in leaktight manner.

Furthermore, in order to actuate said means connected to the tank so as to deliver a certain quantity of water, the drive member is pressed towards the body so as firstly to engage means for putting a valve of the safety device under stress, and then subsequently to engage a switch for controlling the pump means that enable the tank to be pressurized and hot water to be delivered under pressure into the chamber in order to brew the infusion.

Furthermore, in order to interrupt said means connected to the tank for delivering a certain volume of water, the drive member is released, thereby initially opening the switch and thus stopping the pump means, and subsequently releasing the valve and venting the tank to the atmosphere.

Finally, in order to open the chamber by acting on the closure part, so as to remove the used fill, the outward reverse stroke of the drive member is continued so as to cause the closure part to tilt and open the chamber.

BRIEF DESCRIPTION OF THE DRAWINGS

The characteristics and advantages of the invention also appear from the following description given by way of non-limiting example and with reference to the accompanying drawings, in which.

DESCRIPTION OF THE PREFERRED EMBODIMENTS

Figure 1:
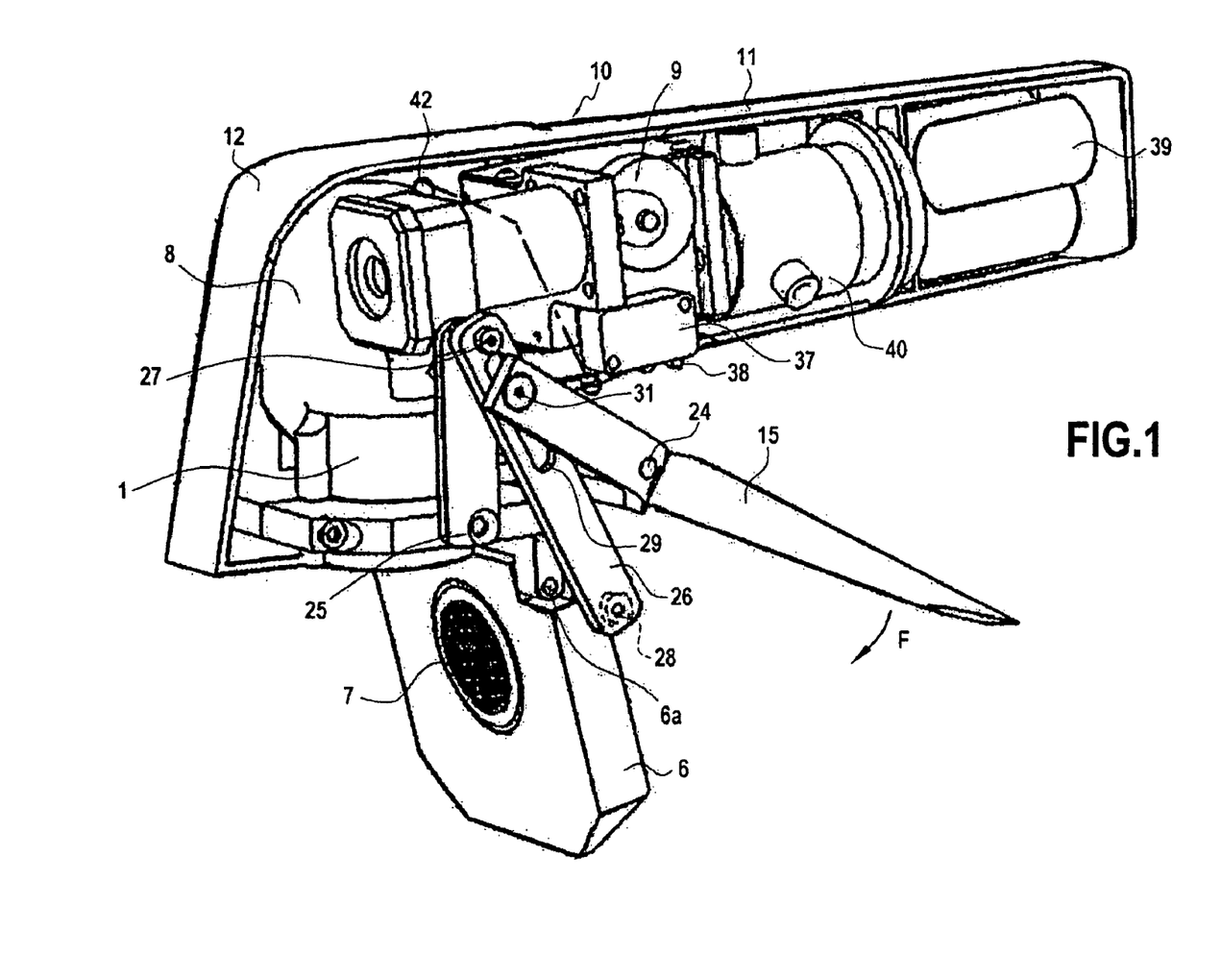
FIG. 1 is a perspective view, with a portion of the housing cut away, and showing an appliance of the invention in which a closure part is in the open position.

FIG. 1 shows an appliance for brewing an infusion from a fill of coffee or tea presented in powder form or in a pack having a textile or metal body.

Figure 3:
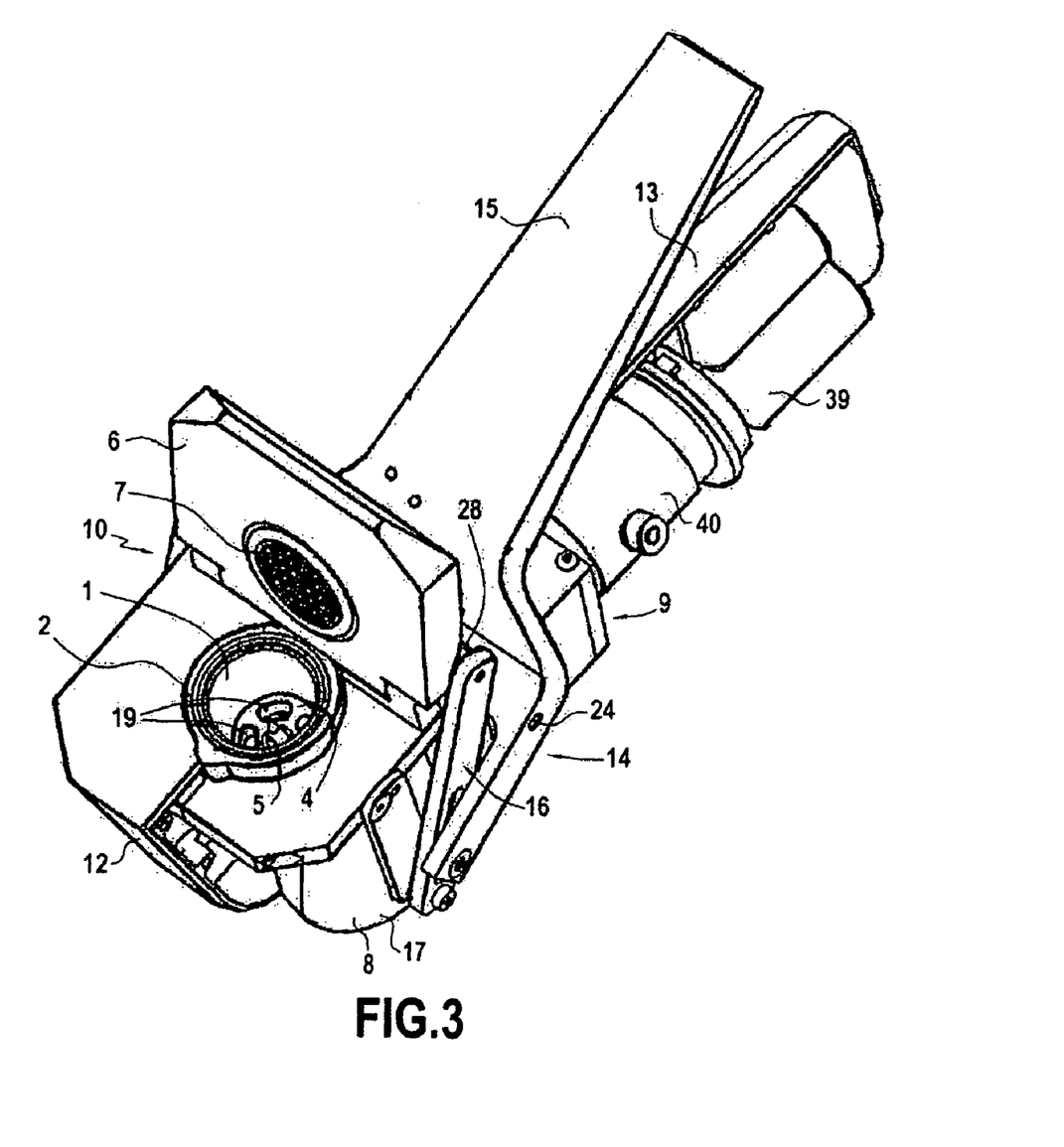
FIG. 3 shows the FIG. 1 appliance but in an upside-down position with the closure part open.
Figure 4:
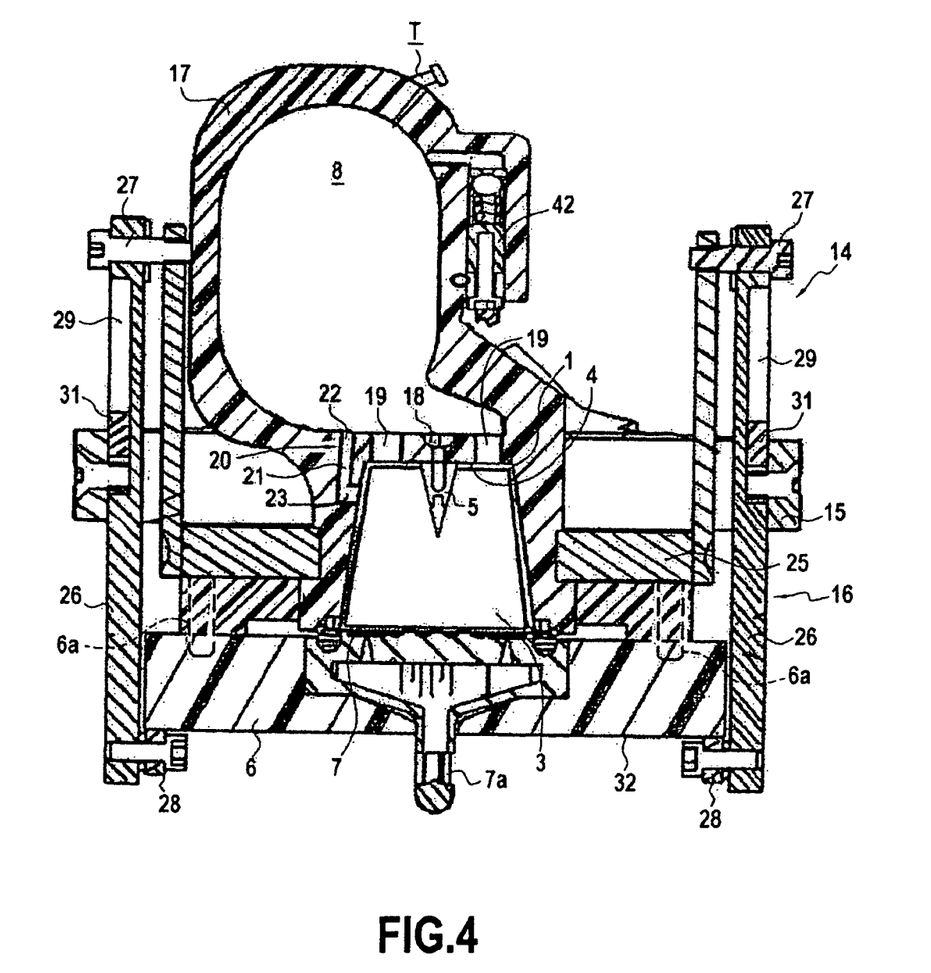
FIG. 4 is a view on a larger scale showing a simplified vertical section of the appliance on line I-I of FIG. 2.

As can be seen better in FIG. 3, the appliance comprises, in a housing 10, a brewing chamber 1 presenting an opening 2 into which it is possible to insert the fill of coffee or tea; specifically, the fill 3 is represented in FIG. 4 by a metal capsule of ordinary type.

In its end wall 4, the chamber 1 presents a hot water feed nozzle 5, a closure part 6 for said chamber presenting a support grid 7 of diameter substantially equal to the diameter of the opening 2, with an orifice 7a through which the brewed infusion flows out. The housing 10 further comprises a water tank 8 communicating with the nozzle 5, pump means 9 suitable, during a brewing cycle, for causing a certain volume of water, raised to a brewing temperature, to be delivered from the tank to said nozzle.

Depending on the pump means selected, such an appliance is particularly suitable for brewing infusions of coffee at low pressure, or else at a high pressure of about 8 bar, in order to obtain espresso-type coffee.

To raise the water to a brewing temperature, it is possible to add an electric heater to the tank, which heater is powered by an electric cord connected to an electricity source such as the mains or a battery.

The closure part 6 is mounted to move relative to the chamber 1 and can occupy an open position or a closed position that correspond respectively to filling/emptying the chamber, and to brewing an infusion. In known manner, sealing is provided between the opening of the chamber and the closure part by interposing a gasket.

Figure 2:
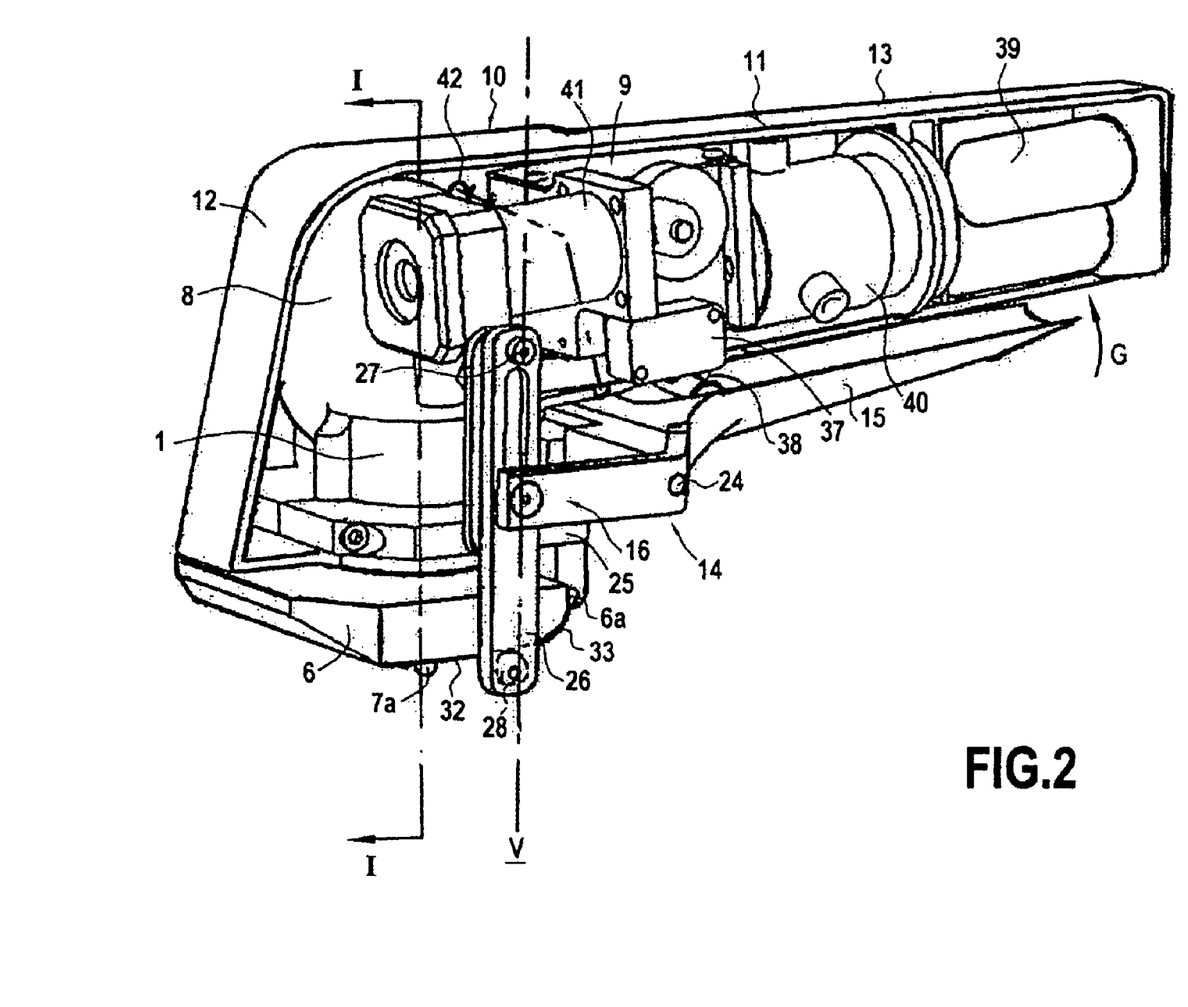
FIG. 2 is a view similar to FIG. 1, but with the closure part in the closed position.

With reference to FIGS. 1 and 2, and in accordance with the invention, the housing 10 presents a portable structure comprising a head 12 containing at least the chamber 1, a body 11 including at least handle means 13 enabling the outflow orifice 7a from the closure part 6 to be placed during a brewing cycle to face down towards a cup for collecting the infusion, and a control mechanism 14 enabling the closure part 6 to be placed in its open and closed position.

As shown, the portable structure of the housing 10 is of an ergonomic oblong shape in which the head 12 includes not only the chamber 1, but also the water tank 8, and is placed transversely relative to the body 11 that has a portion constituting the handle means 13. The handle means are shaped so as to be easy for a user to grasp in one hand, thereby constituting a grip.

The body 11 contains to a large extent the pump means 9.

According to another important characteristic of the invention, and as shown in FIGS. 1 and 2, the closure part 6 is mounted to tilt about an axis 6a extending transversely relative to the head 12 and connected to a control mechanism 14 that comprises a linkage 16 and a drive member 15 hinged to the housing about a pin 24 so as to act via the linkage to cause the closure part to occupy one or other of its open and closed positions.

As shown in FIGS. 3 and 4, the chamber 1 is in the form of a frustoconical goblet for receiving the fill 3 enclosed in a pack having a rigid metal wall. Naturally, the fill could be made using a filter having a woven wall.

In a preferred embodiment of the invention, and as shown in the drawings, the water tank 8 includes a thermally insulating shell 17 so as to keep hot the water that is raised externally to a temperature suitable for making the infusion, preferably selected to lie in the range 80° C. to 100° C. By way of example, the hot water may come from a faucet or from a kettle.

In order to improve thermal insulation, the shell of the tank and the housing can be made as a single part, preferably out of a plastics material of suitable thickness and capable of withstanding a continuous pressure of 7 bar to 8 bar in normal operation.

In order to present a balanced arrangement of the internal parts, the tank is arranged above the chamber in the head 12.

In the example shown in the figures, the tank 8 presents a capacity of about 50 milliliters (ml), that is practically equal to the capacity of a conventional type of coffee cup, which capacity generally lies in the range 40 ml to 50 ml.

As shown in FIGS. 3 and 4, and in particular in FIG. 3 that shows the appliance in the upside-down position with the closure means 6 in the open position, and with the water tank 8 including a closed shell 17, the chamber 1 is connected not only via its nozzle 5 to a water feed duct 18, but also to at least one filler passage 19 arranged in the vicinity of the nozzle. Specifically, the chamber has four passages 19. Furthermore, the tank includes vent means 20 for connection to atmospheric air, thus making it easier to fill the tank with water.

In the embodiment of FIG. 4, the vent means 20 for connection to the atmosphere are constituted by a tube 21 having an open end 22 situated level with the inlet of the passages 19, and opening out at 23 into the side wall of the chamber 1.

It will be understood that the open end 23 is closed during a brewing cycle by the metal wall of the fill 3.

In a variant (not shown), instead of a closed tank, it is possible to envisage using a water tank constituted by a shell presenting at its end a filler orifice adapted to be closed by a stopper mounted in leaktight manner in the orifice.

According to an important characteristic of the invention, shown in particular in FIG. 2, and in order to provide a structure that is strong and safe for the user while brewing an infusion under high pressure, the hinge pin 6a of the closure part is mounted on a frame 25 arranged in the housing, and the linkage 16 includes at least one link 26 that is connected at one end to swing from a pivot 27 that is also secured to the frame 25, and that includes at its other end a moving finger 28 that is engaged with the closure part 6.

The link 26 is actuated by the drive member 15 so that the finger 28 and the pivot 27, in the closed is position (FIG. 2), come into alignment on a vertical axis V contained in a vertical midplane of the chamber 1.

This construction with a frame of the self-supporting type that is preferably made of a rigid material that withstands mechanical stresses, e.g. a metal or a fiber-filled plastics material, enables a housing to be made of a plastics material that is more ordinary, lighter in weight, and of small fabrication cost. In the embodiment shown in the figures, and in order to balance the mechanical stresses exerted on the closure part, the control mechanism is made of parts that are arranged symmetrically on either side of the housing 10.

Thus, as can be seen better in FIG. 4, the drive member 15 is generally in the form of a two-pronged fork with its handle hinged to the housing about the pin 24 and having its prongs disposed laterally on either side of the head 12 to engage with the linkage 16 that is disposed laterally on either side of the head 12.

For simplification purposes, there follows a description of one side only of the control mechanism.

Thus, the link 26 presents a longitudinal slot 29 and is actuated by the drive member that is, for this purpose, hinged about the pin 24 with the end of one of its prongs carrying a stud 31 that engages with the inside edge of the slot 29.

With reference to the figures, it can be seen that the moving finger 28 engages the bottom wall 32 of the closure means 6, said wall presenting a cam-shaped region 33 (FIG. 2) that makes it easier to move said finger, and that enables the closure part 6 to tilt suddenly into its open position.

The sudden tilting movement can be amplified by means of a spring (not shown) arranged about the pin 6a and engaging with the head 12 and said closure part.

It will be understood that starting from the open position of the closure part (FIG. 1 or 3), any action on the drive member 15 in a direction towards the housing (arrow G in FIG. 1) causes the prong to pivot about the pin 24 and thus causes the stud 31 to slide in the slot 29. During this movement, the link 26 pivots on its pivot 27 and drives the finger 28 to move circularly so as to mount onto the cam 33. The finger 28 continues its stroke and consequently drives the closure part towards its closed position, so as to obtain a locking position in which the link 26 maintains sealing between the opening of the chamber and said closure part.

To open the chamber, the drive member is moved away, outwards (arrow F in FIGS. 1 and 2), thereby causing the finger to move in the opposite direction towards the cam until the closure part tilts about the pin 6a towards the rear portion of the body 11, thereby providing a large opening in the anterior region of the head 12.

In order to facilitate the movement of the drive member 15, it is possible, in known manner, to associate a return spring between the housing and the drive member.

In addition, by means of the linkage, it is possible to obtain highly safe operation when brewing the infusion under a high pressure of about 8 bar.

In the closed position (FIGS. 2 and 4), the link 26 is practically in vertical alignment on a vertical axis V.

Thus, the pressure force exerted on the closure part 6 by the fill of coffee and by the infusion is countered by aligned reaction forces acting on the pivot 27 and on the fingers 28. As a result, no force due to pressure is felt in the grip by the user.

In a preferred embodiment of the invention, the pump means 9 comprise an electric pump of the type having a moving piston powered by an electricity source such as a rechargeable battery 39 arranged in the body 11, towards the rear portion thereof.

The electric pump comprises a low voltage motor 40 for driving a piston unit 41 and it is arranged longitudinally in the housing between the tank 8 and the rechargeable battery 39.

In a variant that is not shown in the figures, the rechargeable battery could be replaced by an electrical cord suitable for being connected to the mains, however such an embodiment is less attractive since the appliance is not self-contained.

In a preferred embodiment of the invention, the pump means 9, specifically the piston unit 36, is an air pump connected directly to the tank 8 via a tube T (FIG. 4) and adapted to pressurize said tank so as to cause the hot water to leave it at a determined pressure of about 7 bar to 8 bar.

To switch on the motor, and thus the pump, the invention provides for the appliance to be fitted with a switch 37, which may in particular form part of the pressurizing means, having a control button 38 that can be actuated by a region of the drive member 15 (FIG. 2) when said member is caused to move towards the housing after operating the control mechanism for closing and locking the closure part 6.

In a variant that is not shown in the drawings, provision can be made for said electric pump to be replaced by a cartridge of gas under pressure that includes a valve suitable for being actuated by a control device that is secured to the drive member.

In another variant, said pump means may comprise an electrically-driven water pump that is interposed between the tank 8 and the chamber 1.

In order to guarantee that the appliance operates properly, the water tank 8 is also fitted with a safety valve 42 (shown diagrammatically in FIG. 4) for connecting said tank to the atmosphere, and capable of occupying either a free state in which it enables the tank to be connected to the atmosphere, or else a closed state under stress in which it is held (via a connection shown diagrammatically in dashed lines in FIG. 2) by the drive member 15 during its stroke prior to engaging the switch 37 and preventing connection to the atmosphere, except in the event of abnormal excess pressure.

Such a valve is of conventional type, having a ball pressing on a seat against a rated spring connected to a finger for loading the spring that is actuated by the drive member.

In order to illustrate the operation of the appliance with reference to the accompanying drawings, it is considered that the housing 10 comprises the hot water tank 8 with its closed shell 17, the electrically-driven air pump, and the chamber 1 for receiving a fill of coffee, together with the closure part that is mounted to pivot relative to the head 12 and that is controlled by the control mechanism 14.

The method of making an infusion of coffee in so-called espresso mode is implemented by performing the following steps, Starting from the closure part 6 in its open position (FIG. 1), the handle means 13 constituted by the grip-forming portion of the body 11 are grasped in one hand so as to put the chamber 1 into the position shown in FIG. 3 in which its opening 2 faces upwards;

from a source of hot water external to the appliance, the tank 8 is filled by pouring water, already heated to a temperature lying in the range 80° C. to 100° C., onto the passages 19;

a fill of coffee in a pack is put into the infusion chamber;

the drive member 15 is operated to follow a first upward stroke (arrow G) towards the housing body, thereby working the linkage 16 to bring said closure part 6 into a sealed position against the opening 2;

the appliance is turned over via its grip 13 by turning the body 11 in the hand so as to cause the outflow orifice 7a to face downwards over a coffee cup;

the drive member is pressed (arrow G) towards the body in a second upward stroke so as to engage the brewing cycle, which takes place firstly by closing the safety valve 42 under stress, and secondly by closing the switch 37 that controls the pump means so as to pressurize the tank and drive the hot water under pressure into the chamber 1 and brew the infusion;

then, as soon as the cup is full, the drive member 15 is released so that during its reverse, outward stroke (arrow F) the button 38 is released and thus the switch is opened, so as to stop the pump means, and then the valves 42 are put into the free state so as to enable the pressure in the reservoir to be vented, thereby enabling pressures to be balanced in the chamber; and finally, by continuing to move the drive member in the reverse, outward direction, the fingers 28 are withdrawn from the cam 33 and consequently the closure part 6 is tilted into its open position as shown in FIG. 1.

Other variant embodiments of the invention can be envisaged without going beyond the ambit of the invention.

Thus, provision can be made for the housing to comprise the tank, the chamber, and the pump means, and for the closure part and the control mechanism to constitute an assembly that is mounted removably on the housing, such that the housing and the assembly have mutual engagement means, e.g. constituted by a bayonet connection with studs and a camming surface.

The invention claimed is:

1. An appliance for brewing an infusion, the appliance comprising:
   a water tank;
   a housing including a chamber presenting a hot water feed nozzle and defining an opening through which a fill of brew preparation can be inserted;
   a closure part for closing said chamber, mounted to move relative to said chamber, and capable of moving between an open position and a closed position, which positions correspond respectively to filling/emptying said chamber, and to brewing the infusion, the closure part defining a brew outflow orifice; and
   means connected to the tank to act during a brewing cycle to deliver a certain volume of water that has been raised to a brewing temperature from said tank to said chamber;
   wherein the appliance essentially consists in a portable structure comprising a head containing at least the chamber, and a body including at least handle means for turning over the appliance by hand so as to place the brew outflow orifice, during the brewing cycle, to face down towards a cup for collecting the infusion.

2. The appliance according to claim 1, wherein said water tank forms a portion of said head.

3. The appliance according to claim 1, wherein said means connected to the tank for acting during a brewing cycle to deliver a certain volume of water raised to a brewing temperature from said tank to said chamber comprise pressurizing means for delivering the water to the chamber at a determined pressure.

4. The appliance according to claim 1, wherein the portable structure of the housing presents an ergonomic oblong shape in which the head including the chamber and the water tank is disposed transversely relative to the body, a portion of which constitutes said at least one handle means.

5. The appliance according to claim 1, wherein it further includes at least one control mechanism enabling the closure part to be placed in its open or closed position.

6. The appliance according to claim 5, wherein the closure part is mounted to tilt about a pin extending transversely relative to the head and is connected to the control mechanism that comprises a linkage and a drive member hinged to the housing about a pin, in such a manner as to cause the closure part to occupy one or the other of its open and its closed positions, by acting via the linkage.

7. The appliance according to claim 6, wherein the pivot pin of the closure part is mounted on a frame arranged in the housing, and the linkage comprises at least one link that is mounted at one of its ends to swing from a pivot fastened to said frame, and having its other end including a moving finger in engagement with the closure part; said link being actuated by the drive member in such a manner that the finger and the pivot, in the closed position, come into alignment on a vertical axis contained in the longitudinal midplane of the chamber.

8. The appliance according to claim 6, wherein the drive member is in the form of a two-pronged fork with its handle hinged to the housing about a pin and with its prongs disposed laterally on either side of the head, each carrying a stud, while the linkage has two links disposed laterally on either side of the head, each presenting a slot for receiving a respective one of the studs.

9. The appliance according to claim 1, wherein the tank presents a capacity that is practically equal to the capacity of a coffee cup of conventional type.

10. The appliance according to claim 1, wherein the water tank comprises a thermally insulating shell so as to keep hot the water that is fed thereto from the outside at a temperature that is appropriate for brewing the infusion, and in that the housing is made integrally with the shell.

11. The appliance according to claim 1, wherein the water tank comprises a closed shell, the chamber is connected to the tank by the nozzle, and via at least one filler passage disposed in the vicinity of the nozzle, and in that the tank includes vent means for connection to the atmosphere.

12. The appliance according to claim 1, wherein the water tank is constituted by a shell presenting a filler orifice suitable for being closed by a stopper mounted in a sealed manner in said orifice.

13. The appliance according to claim 3, wherein said pressurizing means are pump means.

14. The appliance according to claim 13, wherein said pump means are constituted by an electrically-driven air pump powered by a source of electricity in order to pressurize said tank.

15. The appliance according to claim 3, wherein said pressurizing means are also provided with a switch, and in that the water tank is also fitted with a safety valve for venting said tank to the atmosphere and capable of occupying either a free state in which it enables the reservoir to be vented to the atmosphere, or a closed state under stress in which it does not allow venting to the atmosphere except in the event of abnormal excess pressure.

16. The appliance according to claim 15, wherein said safety valve is held in the state in which it is closed under stress by the drive member in its stroke prior to operating the switch.

17. The appliance according to claim 1, wherein the closure part is movably mounted on the housing and in that the closure part and the housing include mutual engagement means.

18. The appliance according to claim 3, wherein said pressurization means comprise a gas cartridge connected to the tank and include a valve that can be actuated by a control device.

19. The appliance according to claim 13, wherein said pump means comprise an electrically-driven water pump interposed between the tank and the chamber.

20. The appliance according to claim 3, wherein it includes at least one battery or rechargeable battery for powering said pressurizing means.

21. The appliance according to claim 20, wherein said at least one battery is arranged in said handle means.

* * * * *